April 21, 1953  H. F. McKENNEY ET AL  2,636,150
MAGNETIC AMPLIFIER SYSTEM
Filed March 30, 1951   2 SHEETS—SHEET 1

Inventors
HENRY F. MCKENNEY
HENRY KAPLAN
By Victor D. Borst
Attorney

Inventors
HENRY F. McKENNEY
HENRY KAPLAN
Attorney

Patented Apr. 21, 1953

2,636,150

UNITED STATES PATENT OFFICE 2,636,150

MAGNETIC AMPLIFIER SYSTEM

Henry F. McKenney, Valley Stream, and Henry Kaplan, New York, N. Y., assignors to The Sperry Corporation, a corporation of Delaware Application March 30, 1951, Serial No. 218,490

8 Claims. (Cl. 318—28)

1

This invention relates to electrical amplifier systems and particularly to such systems employing magnetic amplifiers of the saturable core reactor type. Embodiments of the invention are especially adapted for amplifying weak input currents for low impedance loads and are useful, for example, for servo units where small control currents control a relatively large output.

Among the objects of the invention are accuracy, sensitivity and reliability of response to the input or control current. Another object is to provide such a system in which the phase of the output current is sensitive to variations in the control current in opposite direction from a predetermined value. Another object is to eliminate from the output current any effect from lack of symmetry in the wave form of the alternating current supply. Other objects will appear from the particular description of the invention which follows.

The invention contemplates a magnetic amplifier, applicable, for example, to servo units, which may be cascaded through any number of stages and each stage of which has its main or reactance windings connected in parallel across the alternating current line and controlled by similarly poled half wave rectifiers so that the two reactance windings of each stage are energized by the same half cycle of the load current, the successive stages alternating in the half cycle which they utilize. The control windings operate in push-pull relation to the two reactance windings to effect a differential presaturation of the two magnetic paths on the off half cycle of the reactance windings, each control winding after the first being energized by the current resulting from the consequent voltage difference in the output of the reactance windings of the respective preceding stage.

Since the pulses through the control windings are on the off half cycles of their reactance windings, and since the control circuits are of low impedance, voltages will be induced in the control circuits on the active half cycles of the reactance windings which, if the circuit is closed, will cause a current to flow in the control circuit and produce a flux which will affect the saturation condition of the cores. To avoid this induced current in the control circuit, the invention contemplates means, such as properly poled rectifiers, for preventing a short circuiting of the control windings on the active half cycle of their respective reactance windings.

The system is phase sensitive. That is, a reversal of phase of the input will reverse the phase of the output of the system. Consequently the

2 system is adaptable for use as a servo amplifier to control a reversible servo motor, and it is so illustrated in the systems shown by way of illustration in the accompanying drawings in which Fig. 1 is a schematic drawing of a magnetic amplifier system embodying the invention;

Figure 4:
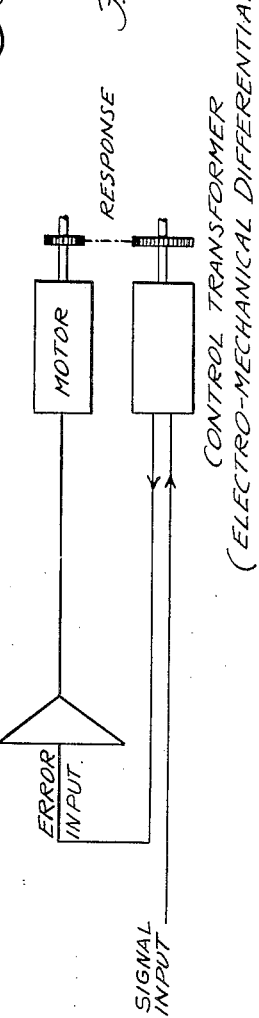
Fig. 4 is a schematic diagram of a servo system employing the magnetic amplifier system of the invention.

It will be assumed, for example, as shown in Fig. 4, that the amplifier is to be used in a follow-up or servo system in which a weak current signal representing an input is to be accurately reproduced with a minimum of time lag by a servomotor which requires a much stronger current than the input provides. In such case it is feasible for the input signal to be impressed upon an electrical differential, such as a control transformer, the output of which represents the error or positional difference between the motor and signal. The output current from this electrical differential is amplified by the system of the present invention and fed to the servomotor which operates the follower mechanism and at the same time operates a response which is fed back to the electric differential until the input is satisfied and the error becomes zero. As shown the response may be delivered to the electrical differential by means of gearing. As will appear later, the motor will be reversible since the amplifier system is phase sensitive.

Figure 1:
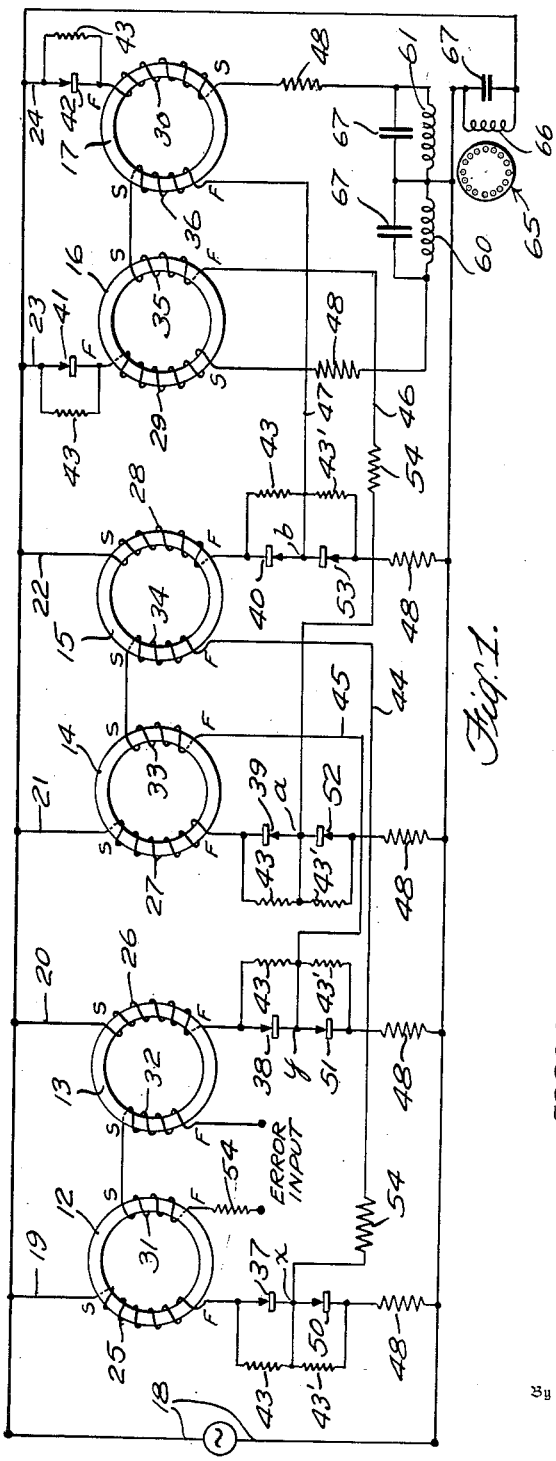

As shown in Fig. 1, the system has three stages which of course may be multiplied as desired. The core structure provides two independent closed flux paths for the reactors, comprising rings 12 and 13 in the first stage, rings 14 and 15 in the second stage and rings 16 and 17 in the third stage. The lines 18 constitute the two sides of a source of alternating current, and each stage has two branch lines in parallel connected across the alternating current source, those for the first stage being numbered 19 and 20, those for the second stage 21 and 22 and for the third stage 23 and 24. In series in each branch circuit is a main reactance winding on the respective core member, winding 25 on core 12 being in the branch line 19, winding 26 on core 13 in line 20, winding 27 on core 14 and line 21, winding on core 15 in line 22, winding 29 on core 16 in line 23 and winding 30 on core 17 in line 24.

Also on the two core members of each stage is wound the control winding for that stage, the control windings being arranged in a series opposition circuit. The control circuit for the first stage has the two windings 31 and 32 in series on the respective cores 12 and 13, the control circuit for the second stage has the two windings 33 and 34 in series on the respective cores 14 and 15, and the control circuit for the third stage has the two windings 35 and 36 in series on the respective cores 16 and 17. All of these windings, both the reactance and control windings, are shown as wound in the same directions on their cores, the connections being made so as to get the flux flow in the desired directions; for assembly purposes the start of each winding being indicated by the letter S and the finish by the letter F.

A unidirectional conducting device in the form of a half wave rectifier is disposed in each branch circuit and those for each stage are poled in the same direction so that both reactance windings utilize the same half cycle of the alternating current, while for alternate stages these rectifiers are poled in opposite directions so that alternate stages utilize alternate half cycles. The two unidirectional devices of the first stage are numbered 37, 38, those of the second stage 39, 40, and those of the third stage 41 and 42. In shunt with each unidirectional device is a resistor 43 which minimizes the effect of temperature on the rectifier and controls the back current on the off half cycle and so serves as a biasing resistor to bring the operating point to the desired position on the hysteresis curve.

The control circuits of the second and third stages are connected across the output leads of the first and second stages, respectively. The leads 44 and 45 of the control circuit for the second stage are connected to the output leads of branch circuits 19 and 20 at points $x$ and $y$, and similarly the leads 46 and 47 of the control circuit for the third stage are connected to the output leads of branch circuits 21 and 22 at points $a$ and $b$. Resistors 48 of selected value are disposed in series in each of the six branch circuits. The value of these resistors 48 is a factor of the load and also a factor of the reactors being used.

To prevent a short circuiting of the control circuits for the second and third stages on their no-signal period when their reactance windings are conducting and, as will be seen, would induce currents in the control circuits, unidirectional conducting devices are provided in the branch circuits between the resistors 48 and the points $x$, $y$, $a$ and $b$, these unidirectional conducting devices being poled in the same direction as devices 37, 38, 39 and 40, respectively. In line 19 is rectifier 50 and in line 20 is rectifier 51, poled respectively in the same direction as rectifiers 37 and 38, and in lines 21 and 22 are rectifiers 52 and 53, respectively, poled in the same direction as rectifiers 39 and 40. In each of the second and third control circuits is a resistor 54 of relatively small ohmic resistance. Therefore the control circuits of the second and third stages are low impedance circuits and draw fairly heavy load currents. A similar resistor 54 will suffice for the error input control circuit of the first stage. Resistors 43' are connected in shunt around each of rectifiers 50, 51, 52 and 53 for the same reason and serving the same purpose as resistors 43.

The output leads of the third stage are connected in series with the reversing windings 60 and 61 of an induction motor 65. These windings are arranged in electrical quadrature to continuously energize winding 60 in the conventional manner. Condensers 67 are disposed in shunt with these field windings as usual.

The control windings, as stated, have a push-pull relationship to the two reactance windings in each stage. One will add to the residual magnetism of its core and the other will oppose or subtract from it. In other words, one control coil will cause its core to be presaturated more than the other by an amount depending on the control current. In the first stage the difference will be relatively small because of the weak signal current and therefore the voltage difference between points $x$ and $y$ will be smaller than that between points $a$ and $b$, and the current flowing in the control circuit of the second stage will therefore be lighter than that in the third stage although much greater than the signal current. In this manner the outputs of the successive stages increase in current strength.

While the voltages induced in the two control windings of each stage are opposed, one will be greater than the other due to the difference in current flowing through the two reactance windings, and hence there is a difference in voltage at points $x$ and $y$ and at points $a$ and $b$ which would cause current to flow in the control circuits on each on or active half cycle of the respective load windings except for the presence of rectifiers 50, 51, 52 and 53. Such induced current in the control circuits would of course affect the presaturation condition.

Figure 2:
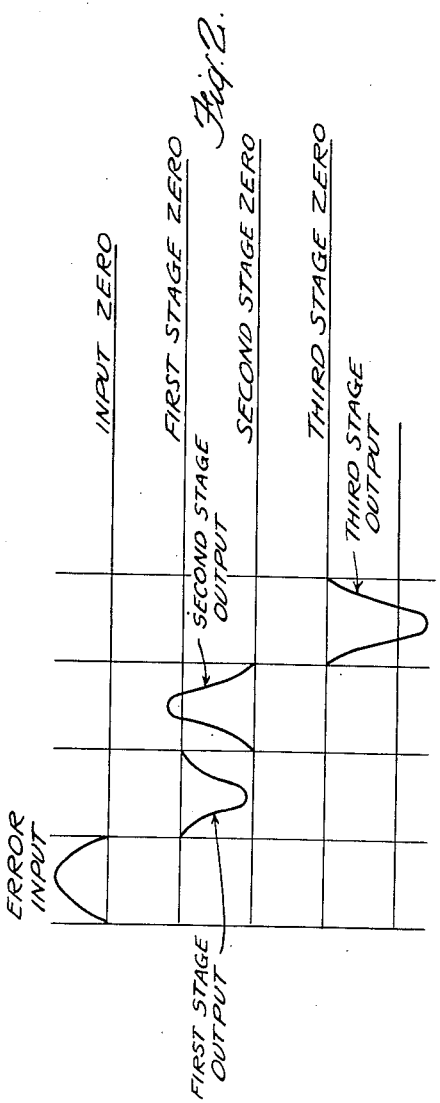
Fig. 2 is a graph indicating the electrical operation of the system with respect to time.

With no error input current in the first stage control circuit, the reactances of coils 25 and 26 are equal. This signal current may be D. C. or modulated A. C. or rectified A. C. In Fig. 2 it is assumed to be rectified A. C. current and the graph illustrates the progress through the three stages of the amplifier. The error input is applied on the off or inactive half cycle of the first stage reactor and has the same frequency. There is a time lag or delay through the amplifier of three half cycles. First the error impulse preconditions cores 12 and 13. Then the output of the first stage which occurs on the next half cycle preconditions cores 14 and 15. Then on the next half cycle the output of the second stage preconditions cores 16 and 17. Then on the next half cycle the output of the third stage energizes the motor.

The reason that the amplifier is phase sensitive is obvious. If the signal current is in one direction the saturation of one core is increased and the other is decreased due to the push-pull arrangement. If the signal current is reversed, the presaturation effect upon the cores is reversed, and therefore the current through the control circuit of the second stage is reversed. This in turn reverses the current in the control circuit of the third stage and hence shifts the dominant output current to the motor in the third stage from one reversing coil to the other.

Figure 3:
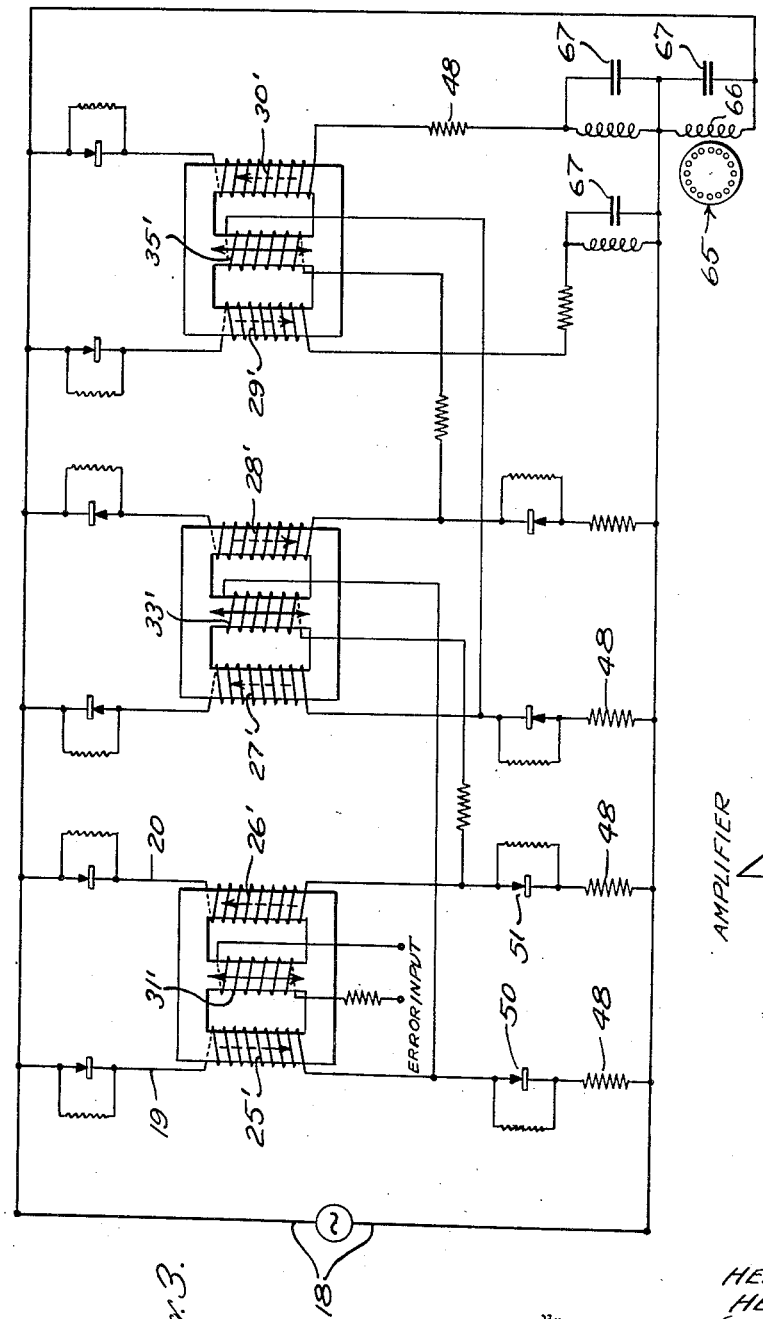
Fig. 3 is a schematic drawing similar to Fig. 1 but showing a slightly modified system embodying the invention.

Fig. 3 discloses a system which employs three-legged cores instead of separate cores in each stage. In such case the push-pull effect is obtained by connecting the windings 25' and 26', 27' and 28', 29' and 30', so that their induced fluxes are in opposite directions with respect to the middle leg, as indicated by the broken arrows, and the control circuit has a single winding on the middle leg, being numbered 31' for the first stage, 33' for the second stage and 35' for the third stage. As in the previous construction, the two reactance windings of each stage are pulsed on the same half cycles and the successive stages employ successive half cycles. It will therefore be seen that functionally the system of Fig. 3 is the same as that of Fig. 1.

The invention as defined in the appended claims has a variety of uses comparable to those of electronic amplifiers such as a thyratron, but it has obvious advantages among which are the elimination of warm-up time, the elimination of need for external power supply, decrease in heat losses, decrease in weight requirements and increase in durability. Certain modifications in the illustrated embodiments within the principle and scope of the invention as defined in the following claims will readily occur to those skilled in the art.

What is claimed is:

1. A multistage magnetic amplifier, each stage comprising a pair of closed magnetic circuits, an inductive load winding on each magnetic circuit and a control circuit including a control winding on the core structure arranged in push-pull relation to the two load windings; a source of alternating current, the load windings in each stage being connected to said source of alternating current in parallel branch circuits, and a unidirectional conducting device in each branch circuit, said device being poled in the same direction for the branch circuits of each stage and the devices for successive stages being oppositely poled, the output leads of the branch circuits of each stage being connected to the control circuit of the succeeding stage.

2. A multistage magnetic amplifier, each stage comprising a pair of closed magnetic circuits, an inductive load winding on each magnetic circuit and a control circuit including a control winding on the core structure arranged in push-pull relation to the load windings; a source of alternating current, the load windings in each stage being connected to said source of alternating current in parallel branch circuits, two unidirectional conducting devices in each branch circuit, said devices being poled in the same direction for the branch circuits of each stage and the devices for successive stages being oppositely poled, and means conductively connecting control circuits of succeeding stages to the output leads of the branch circuits of the respectively immediately preceding stages at points between the two unidirectional conducting devices in each branch circuit of said preceding stages.

3. A multistage magnetic amplifier, each stage comprising core members forming a pair of closed magnetic circuits, an inductive load winding on each magnetic circuit and a control circuit including a control winding on each core member arranged in push-pull relation to the two load windings; an alternating current line, the load windings in each stage being connected across the line in parallel branch circuits, two unidirectional conducting devices in each branch circuit, said devices being poled in the same direction for the branch circuits of each stage and the devices for successive stages being oppositely poled, means conductively connecting control circuits of succeeding stages to the output leads of the branch circuits of the respectively immediately preceding stages at points between the two unidirectional conducting devices in each branch circuit of said preceding stages, and a resistor in the output lead of each branch circuit beyond the connection to the control circuit of the next stage.

4. A multistage magnetic amplifier, each stage comprising two core members each forming a complete magnetic circuit, an inductive load winding on each core and a control circuit including two control windings, one winding disposed on each core and the two control windings being arranged in push-pull flux producing relationship to the two load windings of the stage; an alternating current line, the load windings in each stage being connected across the line in parallel branch circuits, two unidirectional conducting devices in each branch circuit, said devices being poled in the same direction for the branch circuits of each stage and the devices for successive stages being oppositely poled, and means conductively connecting control circuits of succeeding stages to the output leads of the branch circuits of the respectively immediately preceding stages at points between the two unidirectional conducting devices in each branch circuit of said preceding stages.

5. A multistage magnetic amplifier, each stage comprising a three-legged core member forming a pair of closed magnetic circuits having a common leg, an inductive load winding on each outer leg and a control circuit including a control winding on the center leg; a source of alternating current, the load windings in each stage being connected across the alternating current line in parallel branch circuits and so connected in the branch circuits that the flux produced by current passing through the load windings will flow in opposite directions through the said center leg, and a unidirectional conducting device in each branch circuit, said devices being poled in the same direction for the branch circuits of each stage and the devices for successive stages being oppositely poled, the output leads of the branch circuits of each stage being connected to the control circuit of the succeeding stage.

6. A magnetic amplifier comprising a pair of closed magnetic circuits, an inductive load winding on each magnetic circuit, a control winding on the core structure arranged in push-pull relation to the load windings, a source of alternating current, the load windings being connected to said source of alternating current in parallel branch circuits, two unidirectional conducting devices in each branch circuit, said devices being poled in the same direction, a resistor in the output lead of each branch circuit, and a load circuit connected across the output leads of the branch circuits in advance of the resistors and between the two unidirectional conducting devices in the respective branch circuits.

7. A multistage magnetic amplifier servo system comprising, in combination with a source of alternating current, a plurality of saturable core reactors each having two reactor windings and a control winding, the reactor windings being connected in parallel branch circuits across said source, the said reactors being cascaded in series with the control windings of each reactor after the first connected across the output leads of the immediately preceding reactor, a reversible servo motor connected across the output leads of the last reactor, means for supplying a control input current to the control winding of the first reactor, and a half wave unidirectional conducting device in each parallel branch circuit, the said devices being poled in the same direction for the reactor windings of each reactor and the devices for successive reactors being poled in opposite directions.

8. A multistage magnetic amplifier servo system comprising, in combination with a source of alternating current, a plurality of saturable core reactors each having two reactor windings and a control winding, the reactor windings being connected in parallel branch circuits across said source, the said reactors being cascaded in series with the control windings of each reactor after the first connected across the output leads of the immediately preceding reactor, a reversible servomotor connected across the output leads of the last reactor, means for supplying a control input current to the control winding of the first reactor, a half wave unidirectional conducting device in each parallel branch circuit, the said devices being poled in the same direction for the reactor windings of each reactor and the devices for successive reactors being poled in opposite directions, and a second half wave unidirectional conducting device in each of the parallel branch circuits of each reactor preceding the last reactor poled in the same direction as the first mentioned device in each respective branch circuit, the control windings of the respectively succeeding reactors being connected to the output leads between the two unidirectional conducting devices.

HENRY F. McKENNEY.
HENRY KAPLAN.

References Cited in the file of this patent
UNITED STATES PATENTS

| Number | Name | Date |
|---|---|---|
| 2,027,312 | Fitzgerald | Jan. 7, 1936 |